(12) United States Patent
Durocher et al.

(10) Patent No.: US 12,378,916 B2
(45) Date of Patent: Aug. 5, 2025

(54) ENGINE POWER EXTRACTION SYSTEM AND METHOD FOR USING SAME

(71) Applicant: Pratt & Whitney Canada Corp., Longueuil (CA)

(72) Inventors: Eric S. Durocher, Boucherville (CA); Scott Smith, St-Lambert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/990,320

(22) Filed: Nov. 18, 2022

(65) Prior Publication Data

US 2024/0167424 A1  May 23, 2024

(51) Int. Cl.
*F02C 7/32* (2006.01)
*F02C 6/00* (2006.01)
*F02C 6/20* (2006.01)
*F02C 7/36* (2006.01)

(52) U.S. Cl.
CPC ............ *F02C 7/32* (2013.01); *F02C 6/00* (2013.01); *F02C 6/206* (2013.01); *F02C 7/36* (2013.01)

(58) Field of Classification Search
CPC .... F02C 6/00; F02C 6/206; F02C 7/32; F02C 7/36; F05D 2220/323; F05D 2220/76
See application file for complete search history.

(56) References Cited

U.S. PATENT DOCUMENTS

| | | | | |
|---|---|---|---|---|
| 5,161,365 A * | 11/1992 | Wright | ............ | F02C 7/16 60/39.461 |
| 7,552,582 B2 | 6/2009 | Eick | | |
| 9,995,314 B2 * | 6/2018 | Miller | ............ | F04D 19/02 |
| 10,267,237 B2 * | 4/2019 | Pool | ............ | F02C 7/222 |
| 11,702,985 B1 * | 7/2023 | Miller | ............ | F02C 7/224 60/39.83 |
| 2010/0219779 A1 | 9/2010 | Bradbrook | | |
| 2010/0287920 A1 * | 11/2010 | Duparchy | ............ | F02G 5/02 60/670 |
| 2012/0011839 A1 | 1/2012 | Kandil | | |
| 2013/0025406 A1 * | 1/2013 | Lemmers, Jr. | ............ | F02C 7/36 74/650 |

(Continued)

FOREIGN PATENT DOCUMENTS

EP  4036392 A1  8/2022

OTHER PUBLICATIONS

EP Search Report for EP Patent Application No. 23210957.9 dated Apr. 8, 2024.

*Primary Examiner* — Devon C Kramer
*Assistant Examiner* — Henry Ng
(74) *Attorney, Agent, or Firm* — Getz Balich LLC (57) ABSTRACT

A propulsion system for an aircraft includes a gas turbine engine and an engine power extraction system. The gas turbine engine includes a first rotational assembly. The first rotational assembly includes a propeller and a first shaft coupled to the propeller. The first shaft is configured for rotation about a rotational axis of the propulsion system. The engine power extraction system includes a fluid pump, a fluid motor, and a generator. The fluid pump is operably coupled to the first shaft. The fluid pump is in fluid communication with the fluid motor. The fluid pump is configured to pressurize and direct a hydraulic fluid to the fluid motor causing the fluid motor to rotatably drive the generator to generate an electrical power output.

16 Claims, 6 Drawing Sheets

(56) References Cited

U.S. PATENT DOCUMENTS

| | | | |
|---|---|---|---|
| 2013/0125561 A1* | 5/2013 | Schwarz | F02K 3/06 60/802 |
| 2013/0168179 A1* | 7/2013 | Will | F16H 61/431 180/338 |
| 2013/0181452 A1 | 7/2013 | Brust | |
| 2014/0069092 A1* | 3/2014 | Elliott | E02F 9/2292 60/451 |
| 2014/0290265 A1* | 10/2014 | Ullyott | F02C 3/113 60/773 |
| 2014/0325971 A1* | 11/2014 | Hand | F16H 61/4139 60/464 |
| 2017/0356525 A1 | 12/2017 | Mitrovic | |
| 2018/0298777 A1* | 10/2018 | Nguyen | F02C 7/36 |
| 2019/0017443 A1* | 1/2019 | Eifert | F41H 13/0043 |
| 2019/0218977 A1* | 7/2019 | Muldoon | F02C 7/32 |
| 2020/0088099 A1* | 3/2020 | Roberge | F02C 7/224 |
| 2020/0256252 A1* | 8/2020 | Smith | F02C 7/224 |
| 2020/0263609 A1 | 8/2020 | Desjardins | |
| 2020/0290748 A1* | 9/2020 | Larson | F02C 7/32 |
| 2021/0131347 A1* | 5/2021 | Leque | F16H 37/022 |
| 2023/0129714 A1* | 4/2023 | Xiang | B66F 9/07595 475/150 |

* cited by examiner

ENGINE POWER EXTRACTION SYSTEM AND METHOD FOR USING SAME

TECHNICAL FIELD

This disclosure relates generally to aircraft propulsion systems and, more particularly, to systems and methods for extracting power from propulsion system rotational assemblies.

BACKGROUND OF THE ART

Some propulsion systems for aircraft may include systems for extracting power from propulsion system turbomachinery to generate electrical power for a range of aircraft electrical loads. Various systems and methods are known in the art for extracting propulsion system power. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a propulsion system for an aircraft includes a gas turbine engine and an engine power extraction system. The gas turbine engine includes a first rotational assembly. The first rotational assembly includes a propeller and a first shaft coupled to the propeller. The first shaft is configured for rotation about a rotational axis of the propulsion system. The engine power extraction system includes a fluid pump, a fluid motor, and a generator. The fluid pump is operably coupled to the first shaft. The fluid pump is in fluid communication with the fluid motor. The fluid pump is configured to pressurize and direct a hydraulic fluid to the fluid motor causing the fluid motor to rotatably drive the generator to generate an electrical power output.

In any of the aspects or embodiments described above and herein, the gas turbine engine may have a free turbine configuration. The gas turbine engine may further include a second rotational assembly axially displaced from the first rotational assembly. The second rotational assembly may include a second shaft, a bladed compressor rotor, and a bladed turbine rotor. The second shaft may interconnect the bladed compressor rotor and the bladed turbine rotor.

In any of the aspects or embodiments described above and herein, the first rotational assembly may include a reduction gear box (RGB) connected to the first shaft. The RGB may include a housing. The fluid pump may be mounted to the housing.

In any of the aspects or embodiments described above and herein, the propulsion system may further include a nacelle housing the gas turbine engine. The fluid motor and the generator may be positioned within the nacelle.

In any of the aspects or embodiments described above and herein, the propulsion system may further include a nacelle housing the gas turbine engine. The fluid motor and the generator may be positioned outside the nacelle.

In any of the aspects or embodiments described above and herein, the engine power extraction system may further include a conduit circuit. The fluid pump, the fluid motor, and the conduit circuit may form a closed fluid circuit for the engine power extraction system.

In any of the aspects or embodiments described above and herein, the engine power extraction system may further include a pressure-relief bypass valve. The conduit circuit may further include a supply conduit and a return conduit. Each of the supply conduit and the return conduit may extend between and fluidly couple the fluid pump and the fluid motor. The pressure-relief bypass valve may be fluidly coupled to the supply conduit and the return conduit. The pressure-relief bypass valve may be configured to selectively direct the hydraulic fluid from the supply conduit to the return conduit to bypass the fluid motor.

In any of the aspects or embodiments described above and herein, the engine power extraction system may be configured to apply power to the first shaft.

In any of the aspects or embodiments described above and herein, the propulsion system may further include an electrical distribution system electrically connected to the generator. The electrical distribution system may include a battery configured to store the electrical power output of the generator.

In any of the aspects or embodiments described above and herein, the propulsion system may further include an engine control system. The engine control system may include a processor in communication with a non-transitory memory storing instructions, which instructions when executed by the processor, cause the processor to: identify a first operating condition of the propulsion system and control the engine power extraction system to generate the electrical power output, with the generator, based on the identified first operating condition.

In any of the aspects or embodiments described above and herein, the instructions, when executed by the processor, may further cause the processor to: identify a second operating condition of the propulsion system, the second operating condition different than the first operating condition, and control the engine power extraction system to apply power to the first shaft by controlling the generator to rotatably drive the fluid motor.

In any of the aspects or embodiments described above and herein, the engine power extraction system may further include a gear assembly operably coupling the fluid pump to the first shaft. The gear assembly may include a first bevel gear, a second bevel gear, and a gear assembly shaft. The first bevel gear may be disposed on and surrounding the first shaft. The second bevel gear may be rotatably engaged with the first bevel gear. The gear assembly shaft may be coupled to the second bevel gear and configured to rotatably drive the fluid pump.

According to another aspect of the present disclosure, a method for controlling an engine power extraction system for an aircraft propulsion system is provided. The method includes rotating a propeller of the aircraft propulsion system with a first shaft, determining an operating condition for the aircraft propulsion system by identifying a first operating condition of the aircraft propulsion system, and controlling the engine power extraction system, based on the identified first operating condition, to generate an electrical power output with a generator by extracting power from the rotating first shaft using a fluid pump and a fluid motor. The fluid motor is operably coupled to the generator.

In any of the aspects or embodiments described above and herein, determining the operating condition for the aircraft propulsion system may further include identifying a second operating condition of the aircraft propulsion system. The second operational condition may be different than the first operational condition. Controlling the engine power extraction system may further include controlling the engine power extraction system, based on the identified second operating condition, to apply power to the first shaft by controlling the generator to rotatably drive the fluid motor.

In any of the aspects or embodiments described above and herein, the method may further include controlling the engine power extraction system to apply power to the first shaft such that rotation of the first shaft is driven only by the engine power extraction system.

According to another aspect of the present disclosure, a propulsion system for an aircraft includes a gas turbine engine and an engine power extraction system. The gas turbine engine includes a first rotational assembly and a second rotational assembly. Each of the first rotational assembly and the second rotational assembly is configured for rotation about a rotational axis of the propulsion system. The second rotational assembly is axially displaced from the first rotational assembly. The first rotational assembly includes a propeller. The second rotational assembly includes a bladed compressor rotor and a bladed turbine rotor. The engine power extraction system including a hydraulic pump, a hydraulic motor, and a generator. The hydraulic pump is operably coupled to the first rotational assembly. The hydraulic pump is in fluid communication with the hydraulic motor through a conduit circuit containing a hydraulic fluid. The hydraulic pump is configured to pressurize and direct the hydraulic fluid to the hydraulic motor causing the hydraulic motor to rotatably drive the generator to generate an electrical power output.

In any of the aspects or embodiments described above and herein, the hydraulic fluid may be oil.

In any of the aspects or embodiments described above and herein, the engine power extraction system may further include a conduit circuit. The hydraulic pump, the hydraulic motor, and the conduit circuit may form a closed fluid circuit for the hydraulic fluid.

In any of the aspects or embodiments described above and herein, the first rotational assembly may include a first shaft, a bladed power turbine rotor, and a reduction gear box (RGB). The first shaft may be connected to the bladed power turbine rotor. The first shaft may be configured to rotatably drive an input shaft of the propeller via the RGB. The hydraulic pump may be operably coupled to the input shaft.

In any of the aspects or embodiments described above and herein, the RGB may include a housing. The hydraulic pump may be mounted to the housing.

The present disclosure, and all its aspects, embodiments and advantages associated therewith will become more readily apparent in view of the detailed description provided below, including the accompanying drawings.

DETAILED DESCRIPTION

Figure 1:
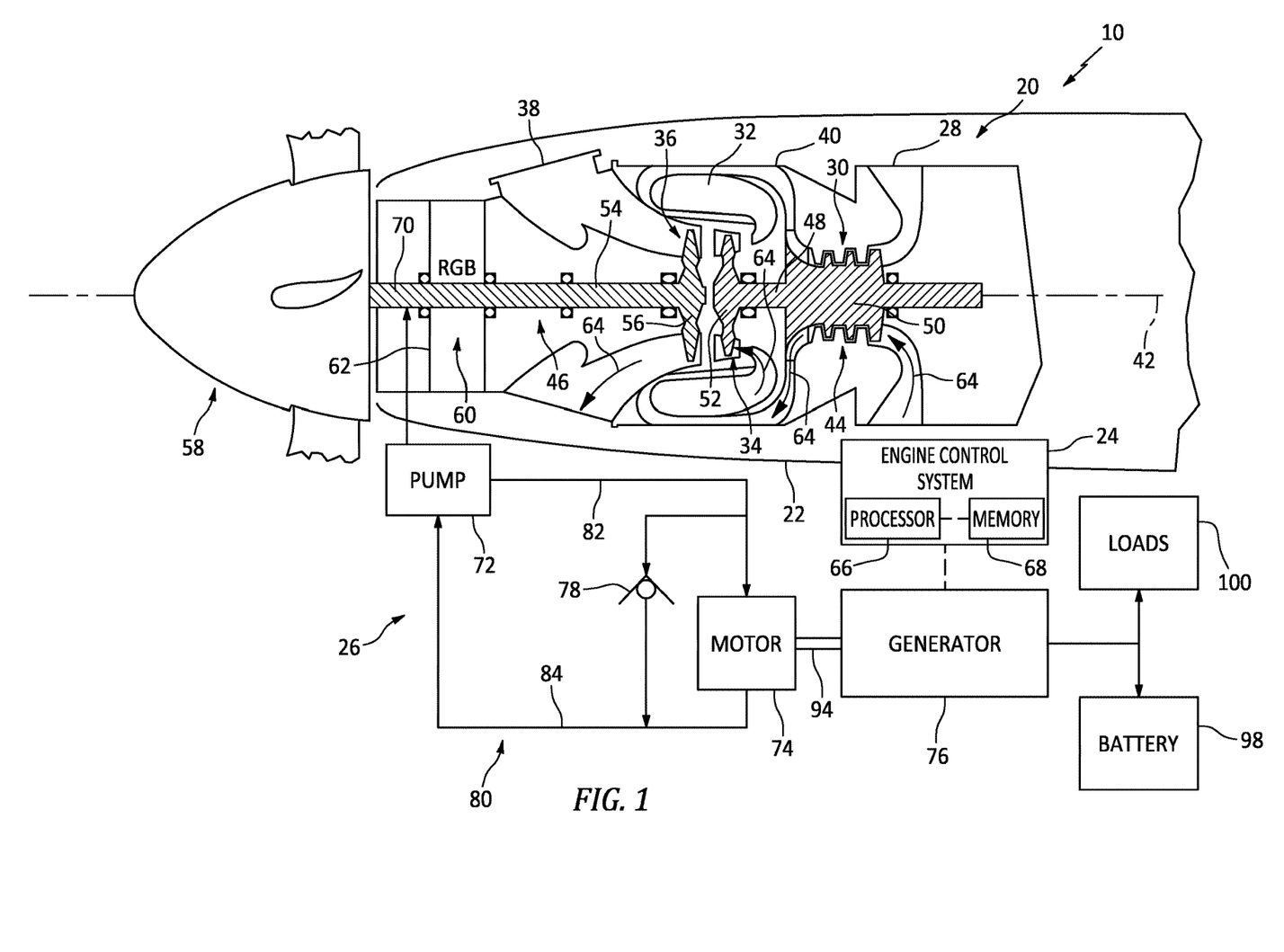
FIG. 1 illustrates a schematic view of a propulsion system for an aircraft, in accordance with one or more embodiments of the present disclosure.

FIG. 1 illustrates a propulsion system 10 for an aircraft. The aircraft propulsion system 10 of FIG. 1 includes a gas turbine engine 20, a nacelle 22, an engine control system 24, and an engine power extraction system 26. The propulsion system 10 (e.g., the nacelle 22) may be mounted to or otherwise formed by a portion of the aircraft such as, but not limited to, a wing or fuselage of the aircraft.

The gas turbine engine 20 of FIG. 1 is configured as a turboprop engine. However, the present disclosure is not limited to any particular configuration of gas turbine engine for the propulsion system 10, and examples of gas turbine engine configurations for the propulsion system 10 may include, but are not limited to, turboshaft gas turbine engine, a turbofan gas turbine engine, a turbojet gas turbine engine, a propfan gas turbine engine, a hybrid-electric gas turbine engine, or the like.

The gas turbine engine 20 of FIG. 1 includes, for example, an air inlet 28, a compressor 30, a combustor 32, a high-pressure turbine 34, a power turbine 36, an exhaust 38, and an engine static structure 40. The air inlet 28, the compressor 30, the combustor 32, the high-pressure turbine 34, the power turbine 36, and the exhaust 38 are arranged sequentially along an axial centerline 42 (e.g., a rotational axis) of the gas turbine engine 20. The engine static structure 40 may include, for example, one or more engine cases for the gas turbine engine 20. The engine static structure 40 may additionally include cowlings, bearing assemblies, and/or other structural components of the gas turbine engine 20. The one or more engine cases form, house, and/or structurally support one or more of the air inlet 28, the compressor 30, the combustor 32, the high-pressure turbine 34, the power turbine 36, and the exhaust 38. The air inlet 28, the compressor 30, the combustor 32, the high-pressure turbine 34, the power turbine 36, and the exhaust 38 may be collectively referred to as an "engine core" of the gas turbine engine 20.

The gas turbine engine 20 of FIG. 1 further includes a first rotational assembly 44 (e.g., a high-pressure spool) and a second rotational assembly 46 (e.g., a power spool). The first rotational assembly 44 and the second rotational assembly 46 are mounted for rotation about the axial centerline 42 relative to the engine static structure 40. The gas turbine engine 20 of FIG. 1 has a "free turbine" configuration in which power for aircraft propulsion is extracted by the second rotational assembly 46 downstream of (e.g., from the exhaust of) the first rotational assembly 44. The free turbine section rotational assembly 46 of FIG. 1 is axially displaced from the first rotational assembly 44 and does not include a compressor rotor for a compressor of the gas turbine engine 20. The present disclosure, however, is not limited to free turbine gas turbine engine configurations.

The first rotational assembly 44 includes a first shaft 48, a bladed compressor rotor 50 for the compressor 30, and a bladed turbine rotor 52 for the high-pressure turbine 34. The first shaft 48 interconnects the bladed compressor rotor 50 and the bladed turbine rotor 52. The second rotational assembly 46 includes a second shaft 54, a bladed power turbine rotor 56 for the power turbine 36, and a propeller 58. The second shaft 54 is connected to the bladed power turbine rotor 56. The propeller 58 may include an input shaft 70. The second shaft 54 of FIG. 1 is configured to rotatably drive the propeller 58 (e.g., the input shaft 70) via a reduction gear box (RGB) 60. The RGB 60 may be configured to drive the propeller 58 at a reduced rotational speed relative to the second shaft 54. The RGB 60 of FIG. 1 includes a housing 62 configured to support and house internal components of the RGB 60. Alternatively, the second shaft 54 may directly interconnect the bladed power turbine rotor 56 and the propeller 58.

During operation of the gas turbine engine 20 of FIG. 1, ambient air enters the gas turbine engine 20 through the air inlet 28 and is directed into a core flow path 64. The core flow path 64 extends axially along the axial centerline 42 within the gas turbine engine 20. More particularly, the core flow path 64 extends axially through the air inlet 28, the compressor 30, the combustor 32, the high-pressure turbine 34, the power turbine 36, and the exhaust 38. The ambient air entering the core flow path 64 is compressed by the bladed compressor rotor 50 and directed into a combustion chamber of the combustor 32. Fuel is injected into the combustion chamber and mixed with the compressed air to provide a fuel-air mixture. This fuel-air mixture is ignited, and combustion products thereof flow through and sequentially cause the bladed turbine rotor 52 and the bladed power turbine rotor 56 to rotate. The rotation of the bladed turbine rotor 52 and the bladed power turbine rotor 56 respectively drive rotation of the first rotational assembly 44 and the second rotational assembly 46. Rotation of the second rotational assembly 46 further drives rotation of the propeller 58 to provide propulsion (e.g., thrust) for the propulsion system 10 and an associated aircraft. Combustion exhaust gas flowing past the bladed power turbine rotor 56 along the core flow path 64 is directed out of the gas turbine engine 20 through the exhaust 38.

The nacelle 22 houses the gas turbine engine 20 and forms and aerodynamic cover for the propulsion system 10. The nacelle 22 may extend circumferentially about (e.g., completely around) the axial centerline 42.

The engine control system 24 of FIG. 1 includes a processor 66 and memory 68. The memory 68 is in signal communication with the processor 66. The processor 66 may include any type of computing device, computational circuit, or any type of process or processing circuit capable of executing a series of instructions that are stored in the memory 68, thereby causing the processor 66 to perform or control one or more steps or other processes. The processor 66 may include multiple processors and/or multicore CPUs and may include any type of processor, such as a microprocessor, digital signal processor, co-processors, a microcontroller, a microcomputer, a central processing unit, a field programmable gate array, a programmable logic device, a state machine, logic circuitry, analog circuitry, digital circuitry, etc., and any combination thereof. The instructions stored in memory 68 may represent one or more algorithms for controlling aspects of the propulsion system 10, and the stored instructions are not limited to any particular form (e.g., program files, system data, buffers, drivers, utilities, system programs, etc.) provided they can be executed by the processor 66. The memory 68 may be a non-transitory computer readable storage medium configured to store instructions that when executed by one or more processors, cause the one or more processors to perform or cause the performance of certain functions. The memory 68 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the engine control system 24 may be achieved via the use of hardware, software, firmware, or any combination thereof. The engine control system 24 may also include input and output devices (e.g., keyboards, buttons, switches, touch screens, video monitors, sensor readouts, data ports, etc.) that enable the operator to input instructions, receive data, etc. The engine control system 24 may be located within the propulsion system 10. Alternatively, the engine control system 24 may be located outside of the propulsion system 10 (e.g., on an aircraft on which the propulsion system 10 is installed).

The engine control system 24 may form or otherwise be part of an electronic engine controller (EEC) for the propulsion system 10. The EEC may control operating parameters of the gas turbine engine 20 including, but not limited to, fuel flow, stator vane position (e.g., variable compressor inlet guide vane (IGV) position), compressor air bleed valve position, propeller rotation speed, propeller blade pitch, etc. so as to control an engine power and/or thrust of the gas turbine engine 20. In some embodiments, the EEC may be part of a full authority digital engine control (FADEC) system for the propulsion system 10.

The engine power extraction system 26 includes a pump 72, a motor 74, and a generator 76. The engine power extraction system 26 may additionally include a pressure-relief bypass valve 78. The pump 72 and the motor 74 are fluidly coupled by a conduit circuit 80. The conduit circuit 80 of FIG. 1 includes a supply conduit 82 and a return conduit 84. The supply conduit 82 is configured to direct a fluid from the pump 72 to the motor 74. The return conduit 84 is configured to direct the fluid from the motor 74 to the pump 72. The fluid for the engine power extraction system 26 may be a hydraulic fluid such as, but not limited to, oil or another lubricant. However, the present disclosure is not limited to any particular fluid for the engine power extraction system 26. The pump 72, the motor 74, and the conduit circuit 80 (e.g., the supply conduit 82 and the return conduit 84) may form a closed circuit (e.g., a fluid circuit in which fluid is not directed into or out of the circuit) for the fluid. The pressure-relief bypass valve 78 and associated conduit may form an additional portion of the closed circuit.

The pump 72 of FIG. 1 is operably connected to the input shaft 70. For example, rotation of the input shaft 70 rotatably drives the pump 72 to draw fluid from the return conduit 84 and to pressurize and direct the fluid to the motor 74 through the supply conduit 82. Alternatively, the pump 72 may be operably connected to the second shaft 54. The pump 72 may be configured, for example, as a centrifugal pump, a hydraulic pump, or the like. However, the present disclosure is not limited to any particular configuration for the pump 72.

Figure 2:
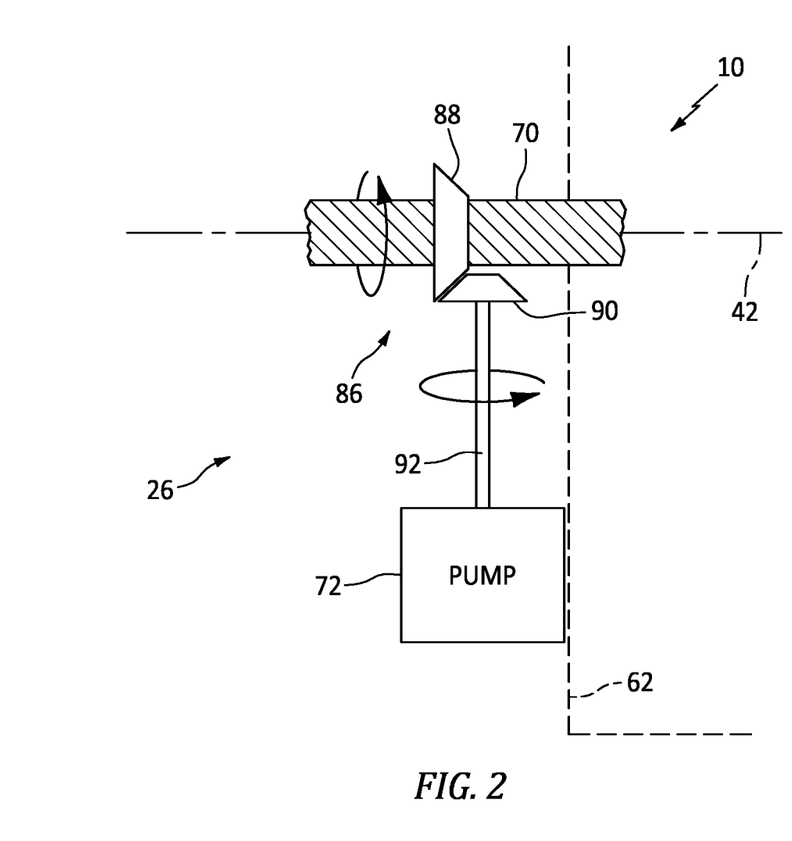
FIG. 2 illustrates a schematic view of a portion of an engine power extraction system, in accordance with one or more embodiments of the present disclosure.

FIG. 2 illustrates an exemplary configuration of the pump 72. The pump 72 of FIG. 2 is mounted on the housing 62 at (e.g., on, adjacent, or proximate) an axial location of the input shaft 70. For example, the pump 72 is disposed radially outward of the input shaft 70. The pump 72 of FIG. 2 is operably connected to the input shaft 70 by a gear assembly 86 of the engine power extraction system 26. The gear assembly 86 of FIG. 2 includes a first bevel gear 88, a second bevel gear 90, and a shaft 92. The first bevel gear 88 is disposed on and surrounds the input shaft 70. The first bevel gear 88 is configured to rotate (e.g., about the axial centerline 42) with the input shaft 70. The second bevel gear 90 is engaged with the first bevel gear 88 such that rotation of the first bevel gear 88 drives rotation of the second bevel gear 90. The shaft 92 (e.g., a tower shaft) is coupled to the second bevel gear 90. Rotation of the second bevel gear 90 drives rotation of the shaft 92 and, therefore, drives the pump 72 to pressurize and direct the fluid to the motor 74 (see FIG. 1).

The motor 74 includes a rotatable shaft 94. The motor 74 is a fluid-driven motor (e.g., a hydraulic motor) configured to rotatably drive the shaft 94 in response to the supply of the pressurized fluid from the pump 72. For example, as the fluid from the pump 72 flows through the motor 74 (e.g., from the supply conduit 82 to the return conduit 84), the motor 74 may extract energy from the flowing fluid to drive the shaft 94. The motor 74 is disposed at (e.g., on, adjacent, or proximate) the generator 76. The motor 74 is operable coupled with the generator 76 by the shaft 94. The motor 74 is configured to rotatably drive the generator 76 with the shaft 94. The motor 74 may be directly or indirectly coupled with the generator 76 (e.g., using the shaft 94). For example, the shaft 94 may be operably coupled to the generator 76 by a gearbox (not shown) or other geared assembly. A gearbox may be used, for example, to drive the generator 76 at an increased rotational speed relative to the shaft 94 rotational speed (e.g., to improve generator 76 efficiency). The present disclosure, however, is not limited to any particular configuration for operably coupling the motor 74 to the generator 76.

The generator 76 is configured to generate an electrical power output in response to rotation driven by the motor 74 via the shaft 94. The generator 76 may be an alternating current (AC) generator or a direct current (DC) generator, and the generator 76 is not limited to any particular configuration provided the generator 76 can generate an electrical power output in response to rotation of the motor 74. The generator 76 may be in signal communication with the engine control system 24. For example, the generator 76 may be configured to be remotely monitored and/or controlled by the engine control system 24. The generator 76 may be a primary or an auxiliary generator for the propulsion system 10 or an aircraft associated therewith. For example, the generator 76 may be an only generator for the propulsion system 10 or an associated aircraft or the generator 76 may be one of a plurality of generators of the propulsion system 10 or an associated aircraft. As will be discussed in further detail, the generator 76 may be disposed on or within the propulsion system 10 or, alternatively, on or within an aircraft associated with the propulsion system 10.

FIG. 1 illustrates an exemplary electrical distribution system 96 of the propulsion system 10 and/or an associated aircraft. The electrical distribution system 96 of FIG. 1 includes a battery 98 and one or more electrical loads 100. However, an electrical distribution system according to the present disclosure may include more, fewer, or alternative electrical components (e.g., AC-DC conversion equipment, circuit breakers, switches, sensors, etc.) relative to the electrical distribution system 96 of FIG. 1. The battery 98 is configured to store an electrical energy (e.g., supplied from the generator 76 and/or another electrical power source). The one or more electrical loads 100 may include electrical loads of the propulsion system 10 and/or an associated aircraft such as, but not limited to, electronic control systems, electric motors, lighting, environmental control systems (ECS), communication equipment, and the like. The generator of FIG. 1 is configured to supply electrical power for the electrical distribution system 96. The electrical power output of the generator 76 may be stored as electrical energy by the battery 98 and/or directed to the one or more electrical loads 100.

The pressure-relief bypass valve 78 of FIG. 1 is fluidly coupled to the supply conduit 82 and the return conduit 84. The pressure-relief bypass valve 78 is configured to selectively direct fluid from the supply conduit 82 to the return conduit 84, thereby bypassing the motor 74. For example, the pressure-relief bypass valve 78 may generally have a shut position to obstruct fluid flow through the pressure-relief bypass valve 78. In this condition, all or substantially all of the fluid from the supply conduit 82 may be directed through the motor 74. The pressure-relief bypass valve 78 may be configured to open when fluid pressure within the supply conduit 82 reaches a threshold pressure value, thereby causing the pressure-relief bypass valve 78 to direct fluid from the supply conduit 82 to the return conduit 84. The pressure-relief bypass valve 78 may facilitate protection of the second rotational assembly 46 and/or components of the engine power extraction system 26 in the event of a failure of the generator 76 (e.g., a seizure of the generator rotor), the motor 74, or another engine power extraction system 26 component.

As described above, the present disclosure engine power extraction system 26 may be used to extract rotational power from the second rotational assembly 46 for use by the propulsion system 10 and/or an aircraft associated therewith (e.g., as electrical power). Because a fluid pump, such as the pump 72, may be significantly smaller than an electrical generator having a comparable power output, the pump 72 may be positioned at (e.g., on, adjacent, or proximate) a forward end of the gas turbine engine 20 (e.g., on the housing 62) without necessitating an increase in a size of the frontal area of the nacelle 22 (e.g., in comparison to accommodating an electrical generator to provide engine power extraction). As a result, the present disclosure engine power extraction system 26 may facilitate improvements in aircraft drag, propeller thrust, and overall aircraft performance, for example, relative to at least some other known engine power extraction systems.

Figure 3:
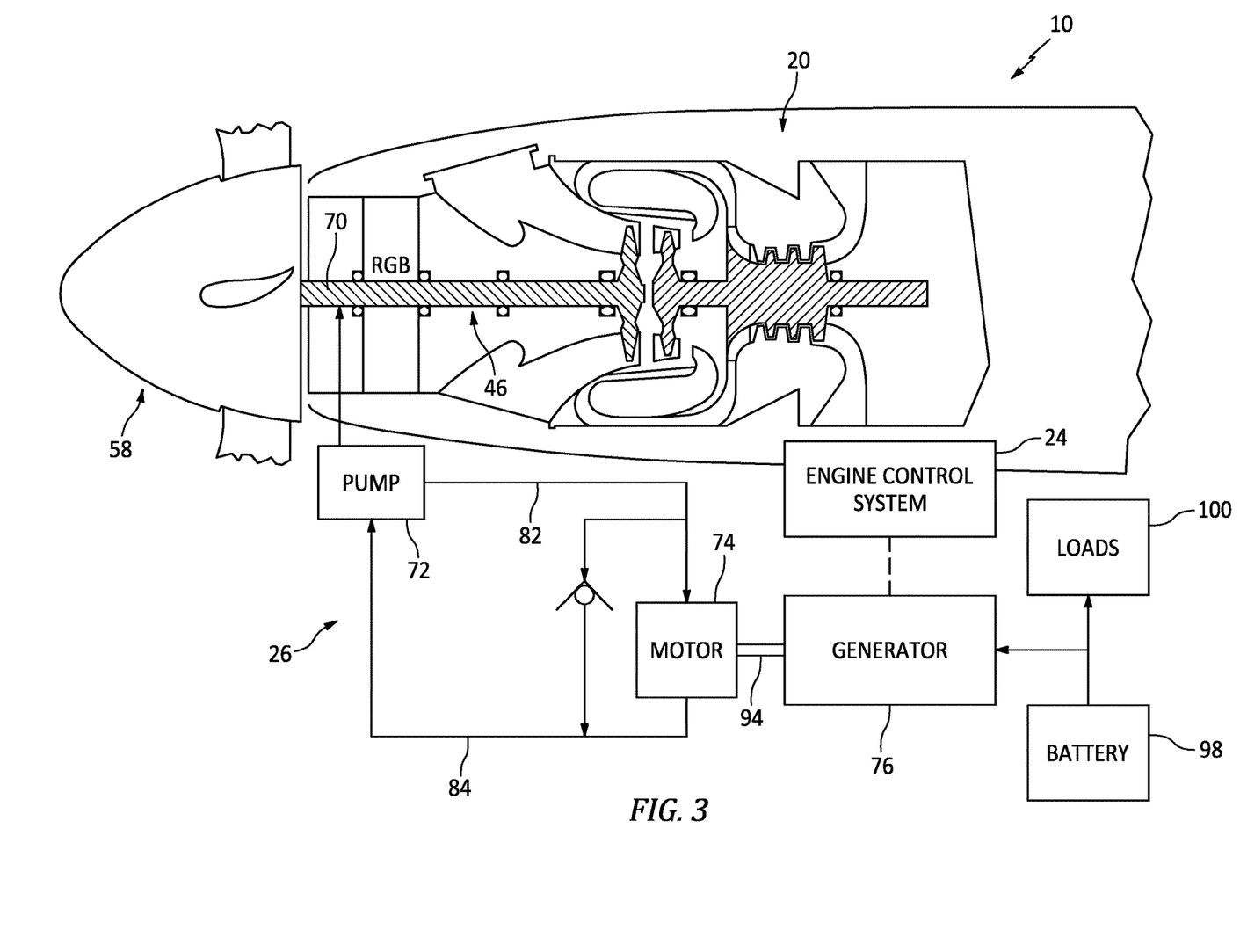
FIG. 3 another schematic view of the propulsion system of FIG. 1, in accordance with one or more embodiments of the present disclosure.

Referring to FIG. 3, in some embodiments, the engine power extraction system 26 may be further configured to apply rotational power to the second rotational assembly 46 (e.g., the input shaft 70). For example, the engine power extraction system 26 may be configured to partially, or even completely, drive rotation of the second rotational assembly 46 and its propeller 58. The generator 76 of FIG. 3 has a motor-generator configuration. The generator 76 may rotatably drive the shaft 94 in response to the application of electrical power to the generator 76. For example, the battery 98 of FIG. 3 may be used to apply electrical power to the generator 76 (as well as the one or more electrical loads 100) to cause the generator 76 to effect rotation of the shaft 94, thereby rotatably driving the motor 74. The pump 72 and the motor 74 may each be configured (e.g., as a hydraulic pump) to operate as a fluid pump and as a fluid motor. Accordingly, rotation of the shaft 94 by the generator 76 may rotatably drive the motor 74 (e.g., operating as a fluid pump) to draw fluid from the return conduit 84 and to pressurize and direct the fluid to the pump 72 through the supply conduit 82. The supply of pressurized fluid from the motor 74 may rotatably drive the pump 72 (e.g., operating as a fluid motor) to apply a rotational force to the input shaft 70 via the gear assembly 86 (see FIG. 2).

Figure 4:
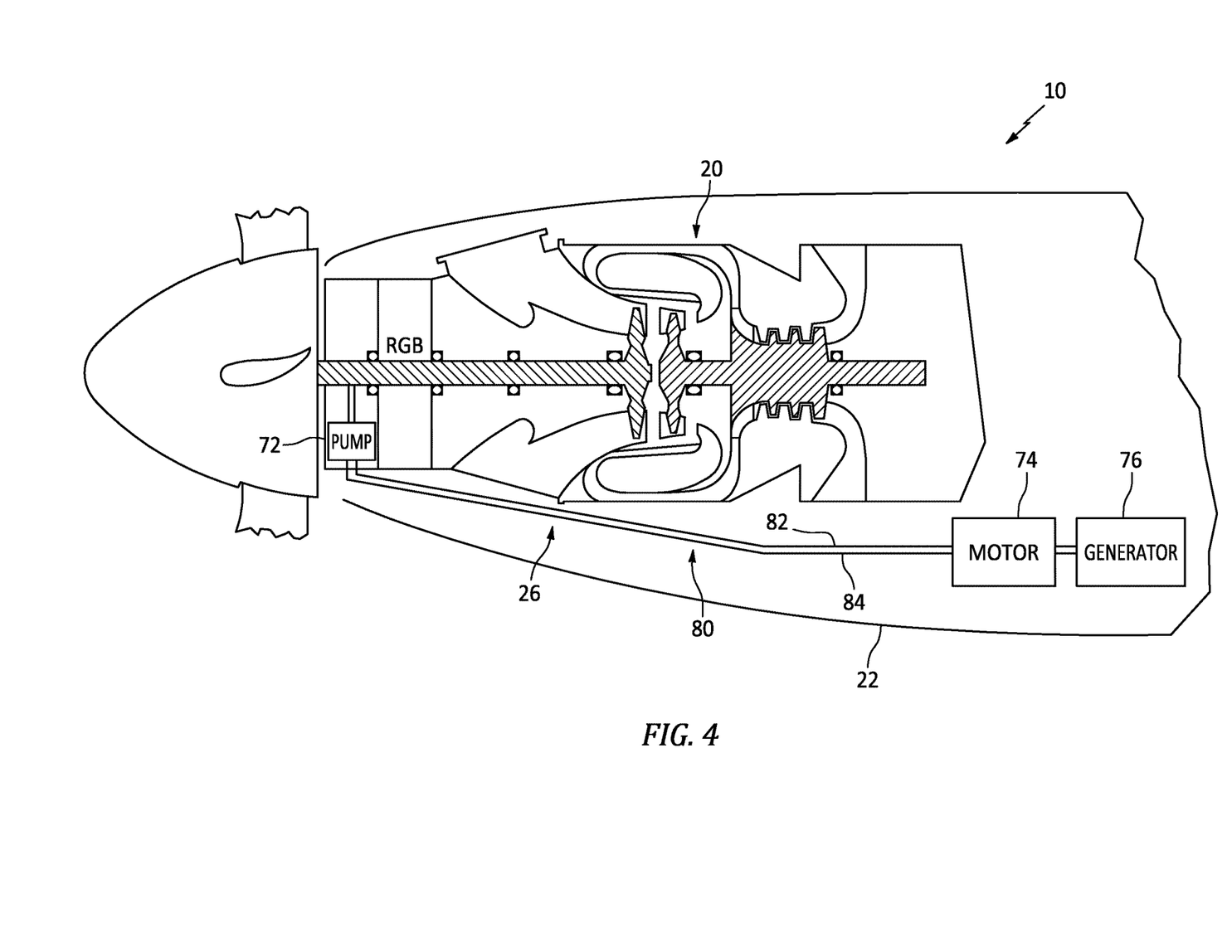
FIG. 4 illustrates a schematic view of an exemplary engine power extraction system for a propulsion system and an associated aircraft, in accordance with one or more embodiments of the present disclosure.
Figure 5:
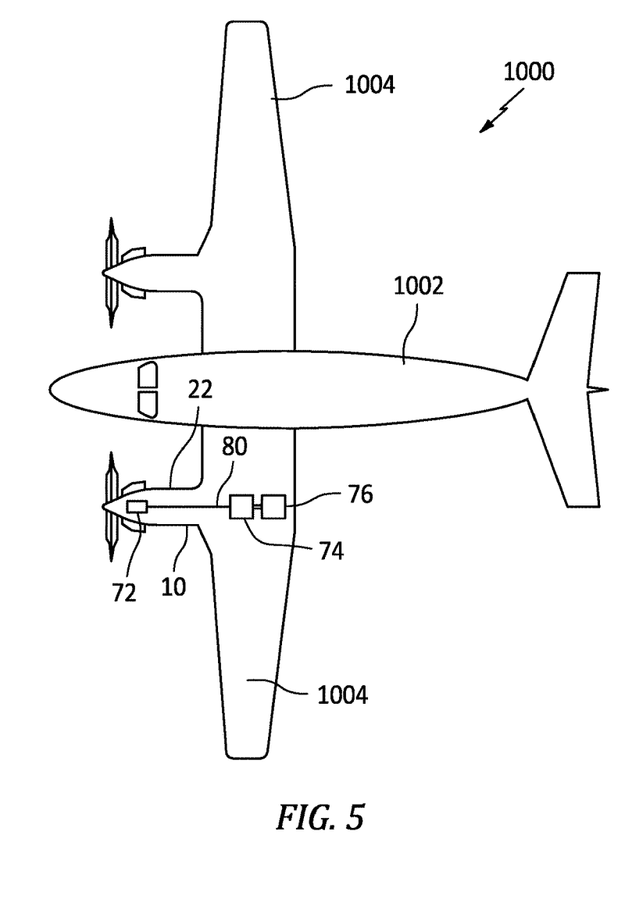
FIG. 5 illustrates a schematic view of another exemplary engine power extraction system for a propulsion system and an associated aircraft, in accordance with one or more embodiments of the present disclosure.
Figure 6:
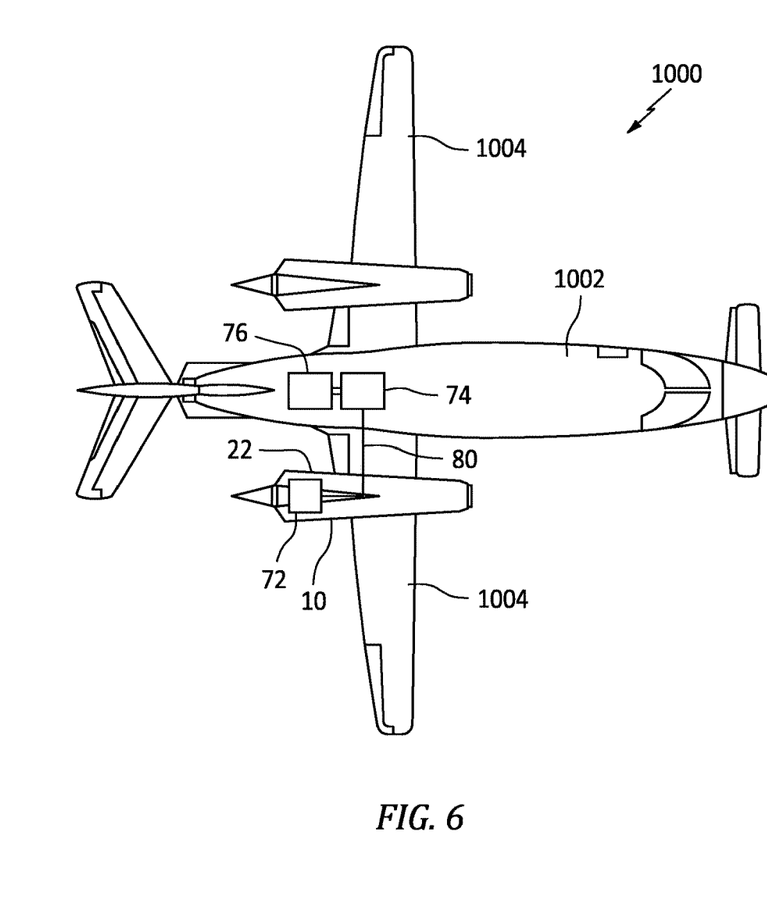
FIG. 6 illustrates a schematic view of another exemplary engine power extraction system for a propulsion system and an associated aircraft, in accordance with one or more embodiments of the present disclosure.

Referring to FIGS. 4-6, various positions of the motor 74 and the generator 76, relative to the propulsion system 10 and an associated aircraft, may be selected in accordance with the present disclosure. The conduit circuit 80 (e.g., the supply conduit 82 and the return conduit 84) may extend through the propulsion system 10 and an associated aircraft from the pump 72 (e.g., at the housing 62) to the motor 74, as necessary, to accommodate a variety of motor 74 positions within the propulsion system 10 and/or an associated aircraft. FIGS. 4-6 illustrate non-limiting, exemplary positions of the motor 74 and the generator 76. FIG. 4 illustrates the propulsion system 10. The motor 74 and the generator 76 of FIG. 4 are positioned within the nacelle 22 of the propulsions system 10 outside of the gas turbine engine 20. FIG. 5 illustrates an aircraft 1000 including the propulsion system 10. The aircraft 1000 includes a fuselage 1002 and wings 1004. The propulsion system 10 of FIG. 5 (e.g., the nacelle 22) is mounted to a wing 1004 of the aircraft 1000. The motor 74 and the generator 76 of FIG. 5 are positioned within the wing 1004 (e.g., outside of the nacelle 22) on which the propulsion system 10 is mounted. FIG. 6 illustrates the aircraft 1000 including the propulsion system 10 (e.g., a pusher-type propulsion system). The propulsion system 10 of FIG. 6 is mounted to a wing 1004 of the aircraft 1000. The motor 74 and the generator 76 of FIG. 6 are positioned within the fuselage 1002 (e.g., outside of the nacelle 22). It should be understood, however, that the present disclosure is not limited to the particular engine power extraction system 26 configurations and positions illustrated in FIGS. 4-6.

Figure 7:
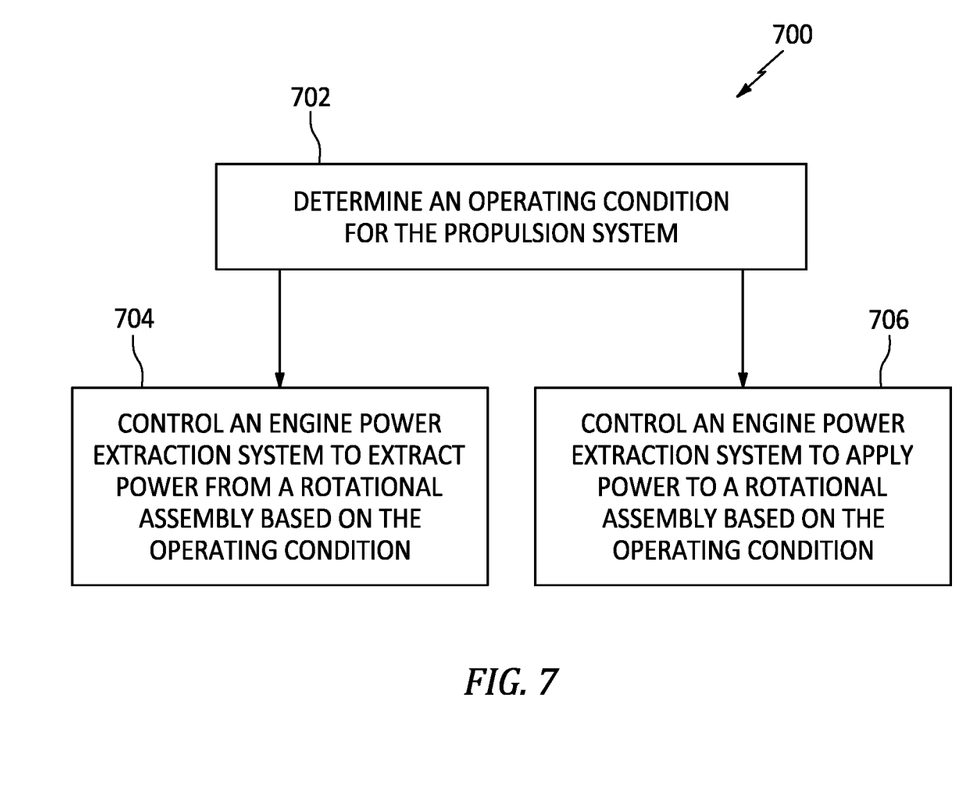
FIG. 7 illustrates a flow chart depicting a method for operating an engine power extraction system for an aircraft propulsion system, in accordance with one or more embodiments of the present disclosure.

Referring to FIGS. 1, 3, and 7, a Method 700 for controlling an engine power extraction system for an aircraft propulsion system is provided. FIG. 7 illustrates a flowchart for the Method 700. The Method 700 may be performed for the propulsion system 10 and its engine power extraction system 26, as described herein. The engine control system 24 may be used to execute or control one or more steps of the Method 700. For example, the processor 66 may execute instructions stored in memory 68, thereby causing the engine control system 24 and/or its processor 66 to execute or otherwise control one or more steps of the Method 700. However, it should be understood that the Method 700 is not limited to use with the propulsion system 10, the engine power extraction system 26, and/or the engine control system 24 described herein.

The Method 700 may include determining an operating condition for the propulsion system 10 (Step 702). For example, the engine control system 24 may identify a propulsion operating condition of the propulsion system 10 such as, but not limited to, takeoff, acceleration, cruise, idle, descent, and the like. The engine control system 24 may identify the propulsion operating condition using, for example, a shaft rotation speed (e.g., the first shaft 48 and/or the second shaft 54), a fuel flow rate (e.g., fuel flow to the combustor 32), a rotational speed of the propeller 58 and/or a propeller blade pitch, etc. The engine control system 24 may additionally or alternatively identify an electrical distribution operating condition of the propulsion system 10. For example, the engine control system 24 may identify that an electrical power demand of the propulsion system 10 and/or an associated aircraft (e.g., from the one or more loads 100) exceeds a current electrical power generation status for the propulsion system 10 (or propulsion systems for a multi-engine aircraft) and/or other electrical generation equipment (e.g., an auxiliary power unit (APU)) for the associated aircraft.

The Method 700 may include controlling the engine power extraction system 26 to extract power from the second rotational assembly 46 (Step 704). The engine control system 24 may control the engine power extraction system 26 to extract power from the second rotational assembly 46 based, for example, on the determined operational condition for the propulsion system 10. For example, the engine control system 24 may control the engine power extraction system 26 to generate electrical power using the generator 76 during relatively low-power conditions of the propulsion system 10 such as, but not limited to, cruise or idle conditions. The electrical power generated by the generator 76 may be directed to the one or more loads 100 and/or stored by the battery 98.

The Method 700 may include controlling the engine power extraction system 26 to apply power to the second rotational assembly 46 (Step 706). The engine control system 24 may control the engine power extraction system 26 to apply power to the second rotational assembly 46 based, for example, on the determined operational condition for the propulsion system 10. For example, the engine control system 24 may control the engine power extraction system 26 to use electrical power from the battery 98 during relatively high-power conditions of the propulsion system 10 such as, but not limited to, takeoff, climb, and acceleration, to apply power to the section rotation assembly 46. The Step 706 may further include controlling rotation of the second rotational assembly 46 using the engine power extraction system 26. For example, rotation of the second rotational assembly 46 may be driven only by the engine power extraction system 26.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system including:
a gas turbine engine including a first rotational assembly, the first rotational assembly including a propeller, a bladed first turbine rotor, a first shaft, and a reduction gear box (RGB), the propeller includes an input shaft, the bladed first turbine rotor is connected to the first shaft, the first shaft is configured for rotation about a rotational axis of the propulsion system, the first shaft is coupled to the input shaft by the RGB, the RGB includes a housing; and
an engine power extraction system including a fluid pump, a fluid motor, and a generator, the fluid pump is mounted on an outer surface of the housing and on an axial location of the input shaft, the fluid pump operably coupled to the input shaft, the fluid pump is connected in fluid communication with the fluid motor by a conduit circuit, the fluid motor is disposed at the generator, the fluid motor is directly coupled with the generator, the fluid pump configured to pressurize and direct a hydraulic fluid to the fluid motor causing the fluid motor to rotatably drive the generator to generate an electrical power output, wherein the fluid pump, the fluid motor, and the conduit circuit form a closed fluid circuit for the engine power extraction system.

2. The propulsion system of claim 1, wherein the gas turbine engine has a free turbine configuration, the gas turbine engine further including a second rotational assembly axially displaced from the first rotational assembly, the second rotational assembly including a second shaft, a bladed compressor rotor, and a bladed second turbine rotor, the second shaft interconnecting the bladed compressor rotor and the bladed second turbine rotor.

3. The propulsion system of claim 1, further comprising a nacelle housing the gas turbine engine, the fluid motor and the generator positioned within the nacelle.

4. The propulsion system of claim 1, further comprising a nacelle housing the gas turbine engine, the fluid motor and the generator positioned outside the nacelle.

5. The propulsion system of claim 1, wherein the engine power extraction system further includes a pressure-relief bypass valve and the conduit circuit further includes a supply conduit and a return conduit, each of the supply conduit and the return conduit extending between and fluidly coupling the fluid pump and the fluid motor, the pressure-relief bypass valve fluidly coupled to the supply conduit and the return conduit, the pressure-relief bypass valve configured to selectively direct the hydraulic fluid from the supply conduit to the return conduit to bypass the fluid motor.

6. The propulsion system of claim 1, wherein the engine power extraction system is configured to apply power to the first shaft.

7. The propulsion system of claim 1, further comprising an electrical distribution system electrically connected to the generator, the electrical distribution system including a battery configured to store the electrical power output of the generator.

8. The propulsion system of claim 1, further comprising an engine control system, the engine control system including a processor in communication with a non-transitory memory storing instructions, which instructions when executed by the processor, cause the processor to:
identify a first operating condition of the propulsion system; and
control the engine power extraction system to generate the electrical power output, with the generator, based on the identified first operating condition.

9. The propulsion system of claim 8, wherein the instructions, when executed by the processor, further cause the processor to:
identify a second operating condition of the propulsion system, the second operating condition different than the first operating condition; and
control the engine power extraction system to apply power to the first shaft by controlling the generator to rotatably drive the fluid motor.

10. The propulsion system of claim 1, wherein the engine power extraction system further includes a gear assembly operably coupling the fluid pump to the first shaft, the gear assembly including a first bevel gear, a second bevel gear, and a gear assembly shaft, the first bevel gear disposed on and surrounding the first shaft, the second bevel gear rotatably engaged with the first bevel gear, the gear assembly shaft coupled to the second bevel gear and configured to rotatably drive the fluid pump.

11. The propulsion system of claim 10, wherein the gear assembly shaft is coupled to the second bevel gear at a first end and the fluid pump at a second end.

12. The propulsion system of claim 1, further comprising a nacelle housing the gas turbine engine, the fluid motor and the generator positioned within the nacelle, and the fluid motor and the generator disposed outside of the gas turbine engine.

13. The propulsion system of claim 1, further comprising a nacelle housing the gas turbine engine, the nacelle mounted on an aircraft wing, and the fluid motor and the generator positioned within the aircraft wing.

14. The propulsion system of claim 1, wherein the fluid pump is disposed radially outward of the input shaft.

15. A propulsion system for an aircraft, the propulsion system including:
- a gas turbine engine including a first rotational assembly, the first rotational assembly including a propeller, a bladed first turbine rotor, a first shaft, and a reduction gear box (RGB), the propeller includes an input shaft, the bladed first turbine rotor is connected to the first shaft, the first shaft is configured for rotation about a rotational axis of the propulsion system, the first shaft is coupled to the input shaft by the RGB, the RGB includes a housing; and
- an engine power extraction system including a fluid pump, a fluid motor, a gear assembly, and a generator, the fluid pump is mounted on the housing on an axial location of the input shaft, the fluid pump operably coupled to the input shaft, the fluid pump is connected in fluid communication with the fluid motor by a conduit circuit, the fluid motor is disposed at the generator, the fluid motor is directly coupled with the generator, the fluid pump configured to pressurize and direct a hydraulic fluid to the fluid motor causing the fluid motor to rotatably drive the generator to generate an electrical power output, the gear assembly operably coupling the fluid pump to the first shaft, wherein the fluid pump, the fluid motor, and the conduit circuit form a closed fluid circuit for the engine power extraction system;

the gear assembly including a first bevel gear, a second bevel gear, and a gear assembly shaft, the first bevel gear disposed on and surrounding the first shaft, the second bevel gear rotatably engaged with the first bevel gear, the gear assembly shaft coupled to the second bevel gear at a first end and the fluid pump at a second end, and the gear assembly shaft configured to rotatably drive the fluid pump.

16. A propulsion system for an aircraft, the propulsion system including:
- a gas turbine engine including a first rotational assembly, the first rotational assembly including a propeller, a bladed first turbine rotor, a first shaft, and a reduction gear box (RGB), the propeller includes an input shaft, the bladed first turbine rotor is connected to the first shaft, the first shaft is configured for rotation about a rotational axis of the propulsion system, the first shaft is coupled to the input shaft by the RGB, the RGB includes a housing; and
- an engine power extraction system including a fluid pump, a fluid motor, and a generator, the fluid pump is mounted on the housing on an axial location of the input shaft, the fluid pump operably connected to the input shaft, the fluid pump disposed radially outward of the input shaft, the fluid pump is connected in fluid communication with the fluid motor by a conduit circuit, the fluid motor is disposed at the generator, the fluid motor is directly coupled with the generator, the fluid pump configured to pressurize and direct a hydraulic fluid to the fluid motor causing the fluid motor to rotatably drive the generator to generate an electrical power output, wherein the fluid pump, the fluid motor, and the conduit circuit form a closed fluid circuit for the engine power extraction system.

* * * * *